Patented Sept. 24, 1946

2,408,326

UNITED STATES PATENT OFFICE 2,408,326

PROCESS FOR PREPARING ALKALI-SOLUBLE METHYL CELLULOSE

Albert T. Maasberg, Huntsville, Ala., assignor to The Dow Chemical Company, Midland, Mich., a corporation of Michigan No Drawing. Application April 26, 1944, Serial No. 532,876

2 Claims. (Cl. 260—231)

This invention relates to a process for the preparation of alkali-soluble methyl cellulose, more particularly alkali-soluble methyl cellulose having novel and unexpected solubility characteristics, by the methylation of alkali cellulose.

A number of methods have been described for the preparation of methyl cellulose of the type which is insoluble in water but soluble in aqueous alkali, herein referred to simply as alkali-soluble methyl cellulose. Of these methods, the methylation of alkali cellulose with a methyl halide is, due to its economy, of greatest commercial value and the herein described invention relates only to this method. There has, however, existed considerable discrepancy between the described procedures for carrying out this method, and the product obtained heretofore has suffered from several undesirable defects. In certain descriptions of the preparation of alkali cellulose suitable for methylating, it has been stated positively that, when aqueous sodium hydroxide is the alkali concerned, the concentration of sodium hydroxide used should not be greater than 25 per cent by weight. On the other hand, examples have been given showing the use of aqueous sodium hydroxide of 50 per cent concentration or higher. No differentiation in the type or properties of the alkali-soluble methyl cellulose produced from alkali cellulose made under such widely different conditions has been made.

The alkali-soluble methyl cellulose prepared by the heretofore described procedures has been limited greatly in its usefulness by certain of its properties which have been assumed to be inherent in the product. Thus, the crude methyl cellulose as obtained directly from the methylation reaction has invariably contained a considerable amount of insoluble matter, which it has been necessary to remove before the product could be used to prepare clear, non-turbid solutions and which, due to its fibrous nature and to the viscous character of the solution of the product, it has been difficult and expensive to remove. Thus, in commercial practice, the use, as a thickening agent for aqueous dispersions, of the hitherto available alkali-soluble methyl cellulose prepared by the methylation of alkali cellulose has been limited to those instances where the presence of considerable insoluble matter has not been objectionable.

Alkali-soluble methyl cellulose is known to be an excellent textile size and a valuable ingredient in textile printing compositions. It would find extensive use for these and other purposes if clear, thick aqueous solutions thereof, free from insoluble material and having a low caustic alkali content could be prepared easily by the methylation of alkali cellulose. It is, of course, possible to prepare alkali-soluble methyl cellulose having most of these desirable characteristics by other methods, such as by the methylation of cupro-sodium cellulose but, as previously pointed out, only at considerably higher cost than is desirable.

It is, therefore, an object of the present invention to provide a method for the preparation, by the methylation of alkali-cellulose, of an alkali-soluble methyl cellulose which may be dissolved substantially completely in dilute aqueous alkali metal hydroxide. An additional object is to provide a method whereby an alkali-soluble methyl cellulose of high degree of uniformity of substitution characterized by its substantially complete solubility in 4 per cent sodium hydroxide solution may be prepared by the methylation of alkali cellulose.

These and related objects are accomplished readily by carrying out the preparation of alkali cellulose and its subsequent methylation under carefully controlled conditions such that the methyl cellulose so prepared has an exceptionally high degree of uniformity of substitution and the methoxyl content thereof falls within a certain prescribed range, hereinafter fully disclosed. It has been found that, when the method is carried out in the manner herein described, not only are the methoxyl groups more uniformly substituted along the cellulose chain, but the properties of the ether are altered to a marked and unexpected degree. The present invention provides a product which is alkali-soluble when it is methylated to an extent as low as from about 6 to about 13 per cent methoxyl content and which, as isolated directly from the methylation reaction mixture, is substantially completely soluble in aqueous alkali to form a solution requiring no purification, such as by filtration, to remove insoluble material before it is suitable for use. The product may be dissolved readily in sodium hydroxide solution of from 3 to 4 per cent concentration, and the solution may subsequently be diluted so that the concentration of alkali in the diluted solution is as low as 2 per cent or lower without separation of the methyl cellulose. The dissolving step may be carried out at from 15° to 20° C. and without a preliminary freezing step. Thus, the methyl cellulose prepared by the method of the invention may, after recovery from the methylation reaction mixture, simply be stirred into from 3 to 4 per cent aqueous sodium hydroxide at 15° to 20° C., whereupon it dissolves rapidly to form a substantially haze-free colorless thickened solution which is stable at all ordinary working temperatures over long periods of time and which may, if desired, be diluted with approximately its own volume of water to reduce further the concentration of alkali therein. Other alkali metal hydroxides, such as potassium hydroxide, may, of course, be used in preparing such thickened solutions.

Methyl cellulose having the above characteristics is, for many purposes, greatly superior to that previously available and is of great value in the preparation of textile sizes, textile printing pastes, and of thickened aqueous solutions, suspensions, and dispersions, generally. The exceptionally low concentration of alkali required to dissolve the new methyl cellulose extends widely its usefulness as a thickening agent over that of the hitherto available product.

In carrying out the process, it is essential to exercise certain precautions relative to the proportion and concentration of the aqueous sodium hydroxide, or other alkali metal hydroxide, used in preparing the alkali cellulose intermediate. Thus, it has been found necessary, in the case of sodium hydroxide to use a solution containing not less than about 27.5 per cent and not more than about 45 per cent, preferably not more than 35 per cent, by weight of sodium hydroxide. Furthermore, the weight ratio of actual sodium hydroxide to cellulose maintained during the preparation of the alkali cellulose is important and should be kept between 0.35 and 0.60. If either the concentration of the sodium hydroxide solution or the proportion of sodium hydroxide relative to the amount of cellulose is permitted to deviate from within these limits, the quality of the product will suffer and there will be present therein varying but undesirable amounts of alkali-insoluble substances. Thus, if the concentration of the aqueous sodium hydroxide is allowed to fall as little as to 25 per cent or below, a product completely soluble in dilute alkali is not obtained. Similarly, when the alkali cellulose is made using an aqueous alkali of concentration greater than about 45 per cent, considerable alkali-insoluble matter is present in the product. The desirability of maintaining the concentration of the alkali used within the above-defined limits is apparent from Example 2. It is obvious that, when an alkali metal hydroxide other than sodium hydroxide is used in preparing the alkali cellulose, the proportion thereof with respect to the cellulose present in the reaction mixture will differ somewhat from the above-mentioned proportions of sodium hydroxide due to the difference in molecular weight of such other hydroxide used. Thus, when the alkali used is potassium hydroxide, the proportion thereof may be as high as 0.84 part for each part of cellulose instead of the 0.60 part mentioned in the case of sodium hydroxide.

The cellulose used, e. g. cotton linters, wood cellulose of high alpha-cellulose content, etc., which may be of any viscosity type, may be steeped or moistened with the sodium hydroxide solution in any convenient manner which will insure a thorough and even distribution of the solution through the fibrous cellulosic mass. Treatment of the cellulose with the sodium hydroxide solution may be carried out at ordinary temperatures, such as between about 15° and about 35° C., although temperatures higher or lower than these may be used, if desired. The alkali cellulose so prepared may be used either immediately or after storing or aging, in the methylation step of the process. The alkali cellulose may be shredded before it is methylated to tear apart the fibers and to insure easy and rapid penetration of the methylating agent to every part of each fiber.

The methylation is carried out by warming together the alkali cellulose and a halo methane, such as methyl chloride or methyl bromide. Usually from about 0.15 to about 0.5 part, preferably from about 0.25 to 0.4 part, by weight of methyl chloride is used for each part of cellulose present in the alkali cellulose, depending upon the degree of methylation desired and the ratio of alkali to cellulose in the alkali cellulose. Since the methylating agent boils at a low temperature, the process is carried out under pressure, the alkali cellulose and methyl chloride or methyl bromide being heated together in a pressure vessel, preferably with agitation, under the requisite conditions of time and temperature. Considerable latitude may be exercised in the conditions under which the methylation is carried out since it appears that the high uniformity and consequent highly soluble character of the product obtained is due in great measure to the highly uniform character of the alkali cellulose. Usually, however, the methylation is carried out by heating the mixture at a temperature of from about 35° to about 75° C., under autogenous pressure for from 4 to 10 hours. The methylating conditions should be adjusted so that the methyl cellulose produced contains from 6 to 13 per cent, preferably from 8.0 to 12.5 per cent, methoxyl content. Although methyl cellulose of good solubility having a somewhat higher methoxyl content may be prepared by methylating to a higher degree, this is usually undesirable due to the added expense involved.

After the methylation has proceeded to the desired degree, the methyl cellulose is recovered from the reacted mixture in any convenient manner. For example, the reacted mixture may be agitated thoroughly with hot water and the hot suspension filtered. The unused alkali in the suspension may be partially neutralized before filtering, if desired. The methyl cellulose is substantially insoluble in water whereas the sodium halide formed during the reaction, together with any unreacted sodium hydroxide or other water-soluble inorganic salts which may be present, are dissolved readily by the hot water. Upon filtering the suspension the methyl cellulose is obtained as a white fibrous mass which may be dried or which may, if desired, be used directly without drying.

Certain advantages of the invention are apparent from the following examples which are included merely by way of illustration and are not to be construed as limiting.

Example 1

Fifteen parts by weight of six second cotton linters was dipped in a bath of 30 per cent technical grade sodium hydroxide solution maintained at a temperature of 25° C. The dipped linters analyzed 18.3 per cent sodium hydroxide, 43.7 per cent water, 37.8 per cent cellulose and 0.2 per cent sodium chloride. The ratio of actual sodium hydroxide to cellulose was 0.48 and the ratio of water to cellulose was 1.16. The alkali cellulose was then shredded for 10 minutes, the water in the jacket of the shredder being kept at a temperature of about 5° C.

40 parts by weight of the shredded alkali cellulose and 4 parts of methyl chloride were heated together with agitation in a pressure vessel at 55° C. The pressure rose rapidly during the initial heating of the mixture, to about 100 pounds per square inch (gauge) and then fell gradually, finally reaching atmospheric pressure after 7.5 hours of heating. The reacted mixture, which contained 7.9 per cent of unreacted sodium hydroxide, was added with agitation to 256 parts of water at a temperature of about 90° C. The hot suspension was stirred thoroughly to break up any lumps and to dissolve soluble inorganic compounds and was then filtered and the methyl cellulose washed thoroughly with hot water on the filter until it was free of sodium chloride and sodium hydroxide. The washed methyl cellulose was then dried. The yield consisted of 15.2 parts of methyl cellulose having a methoxyl content of 11.5 per cent.

The methyl cellulose prepared in the above example was completely soluble in 4 per cent sodium hydroxide solution at 20° C. The solution was free from haze or undissolved particles and was substantially colorless. It could be diluted with an equal volume of water without separation of any of the methyl cellulose. A 2 per cent solution of the methyl cellulose in 4 per cent aqueous sodium hydroxide had a viscosity of 78 centipoises at 20° C.

Example 2

A number of batches of methyl cellulose were prepared in a manner similar to that described in Example 1, except that the concentration of the sodium hydroxide solution used in preparing the alkali cellulose was varied within the range of from 20 to 50 per cent by weight. Several viscosity types of cotton linters, e. g. 6 second, 15 second, and 600 second, were included. The ratios of actual sodium hydroxide and of methyl chloride to the cellulose used were substantially the same in most cases. In the following table there are given the viscosity type of cotton, the per cent concentration of the sodium hydroxide solution, and the weight ratios of actual sodium hydroxide and of methyl chloride with respect to the cellulose used in each case together with the per cent methoxyl content and the per cent alkali-insoluble matter in each batch of methyl cellulose prepared. The per cent insoluble matter was determined by dissolving 1 part of the methyl cellulose in 99 parts of 4 per cent sodium hydroxide solution and centrifuging the solution. All percentages and ratios given in the table are by weight. The data concerning batches prepared using sodium hydroxide of 20, 25 and 50 per cent concentration are included by way of comparison.

Table

| No. | Viscosity type of cotton linters (sec.) | Proportions of reactants | | | Analysis of product | |
|---|---|---|---|---|---|---|
| | | NaOH (per cent (conc.)) | Ratio NaOH/Cellulose | Ratio Methyl chloride/Cellulose | Per cent methocyl | Per cent insoluble |
| 1 | 6 | 20 | 0.54 | 0.31 | 9.0 | 0.4 |
| 2 | 6 | 20 | .53 | .28 | 8.3 | 1.2 |
| 3 | 6 | 25 | .52 | .27 | 9.0 | 1.0 |
| 4 | 6 | 25 | .51 | .27 | 9.7 | 0.4 |
| 5 | 6 | 27.5 | .50 | .35 | 12.5 | 0.1 |
| 6 | 6 | 27.5 | .49 | .28 | 10.4 | 0.1 |
| 7 | 6 | 30 | .49 | .28 | 13.5 | 0.02 |
| 8 | 6 | 30 | .48 | .32 | 11.5 | 0.02 |
| 9 | 15 | 30 | .52 | .16 | 6.9 | 0.05 |
| 10 | 600 | 30 | .51 | .23 | 8.2 | 0.05 |
| 11 | 6 | 35 | .51 | .31 | 11.1 | 0.02 |
| 12 | 6 | 35 | .51 | .26 | 11.5 | 0.01 |
| 13 | 6 | 40 | .51 | .26 | | 0.03 |
| 14 | 6 | 40 | .50 | .26 | 12.5 | 0.04 |
| 15 | 6 | 45 | .54 | .30 | 12.3 | 0.02 |
| 16 | 6 | 50 | .49 | .30 | 11.0 | 1.0 |
| 17 | 6 | 50 | .50 | .31 | 12.5 | 0.7 |

I claim:

1. The method which comprises providing a fibrous cellulose of high alpha-cellulose content, absorbing uniformly therein, at from 15° to 35° C., an aqueous alkali metal hydroxide solution of from 27.5 to 45 per cent concentration in an amount equivalent to from 0.35 to 0.60 part by weight of sodium hydroxide per part of cellulose, treating the so-formed alkali cellulose under autogenous pressure in a closed system at from 35° to 75° C. with from 0.15 to 0.5 part by weight of a methyl halide, calculated as methyl chloride, per part of cellulose, until the resulting methyl cellulose contains from 6 to 13 per cent of methoxyl, and separating from the reaction mixture the so-formed methyl cellulose which is insoluble in water and is soluble directly, to form haze-free solutions, in 3 to 4 per cent aqueous sodium hydroxide solution at 15° to 20° C. without further chilling, which alkaline solutions of the methyl cellulose may be diluted with an equal volume of water without precipitation of the methyl cellulose.

2. The method which comprises providing a fibrous cellulose of high alpha-cellulose content, absorbing uniformly therein, at from 15° to 35° C., an aqueous solution of sodium hydroxide of from 27.5 to 35 per cent concentration in an amount equivalent to from 0.35 to 0.60 part by weight of sodium hydroxide per part of cellulose, treating the so-formed alkali cellulose under autogenous pressure in a closed system at from 35° to 75° C. with from 0.25 to 0.4 part by weight of methyl chloride per part of cellulose until the resulting methyl cellulose contains from 8 to 12.5 per cent by weight of methoxyl, and separating from the reaction mixture the so-formed methyl cellulose which is insoluble in water and is soluble directly, to form haze-free solutions, in 3 to 4 per cent aqueous sodium hydroxide solution at 15° to 20° C. without further chilling, which alkaline solutions of the methyl cellulose may be diluted with an equal volume of water without precipitation of the methyl cellulose.

ALBERT T. MAASBERG.